(No Model.)
A. E. JESTER & J. G. ALEXANDER.
GATE.
No. 508,573. Patented Nov. 14, 1893.
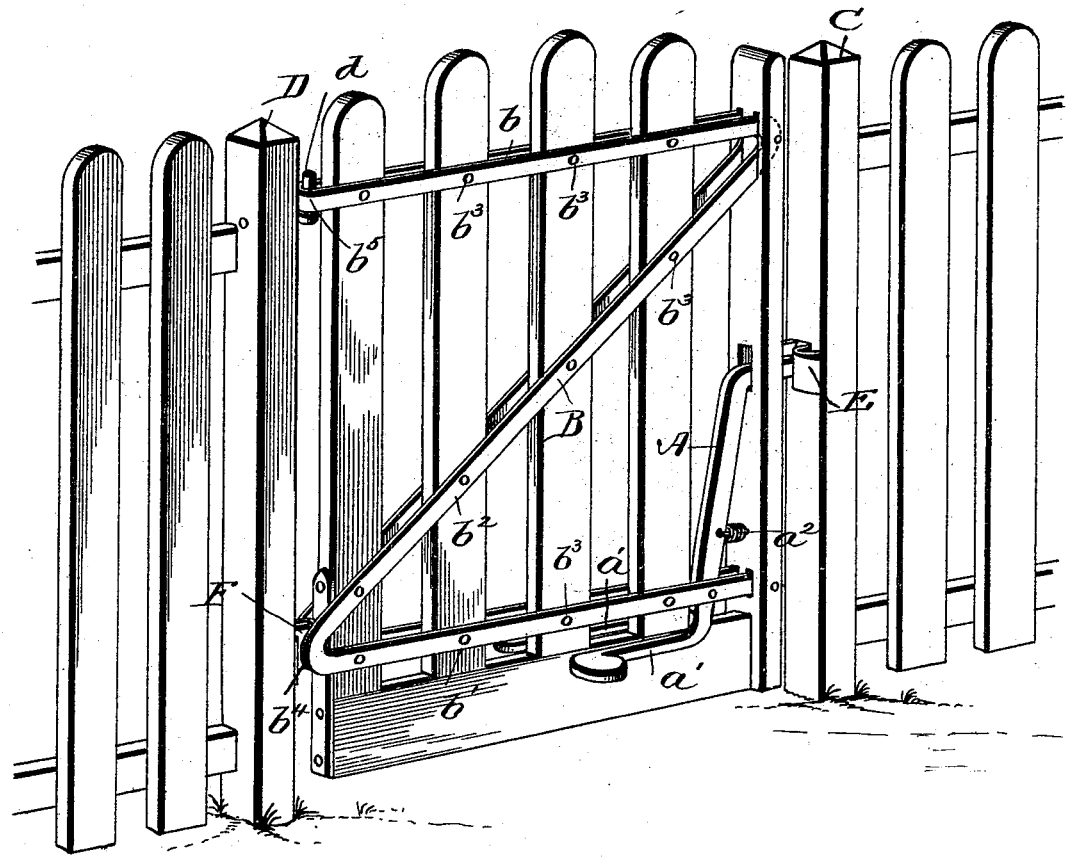
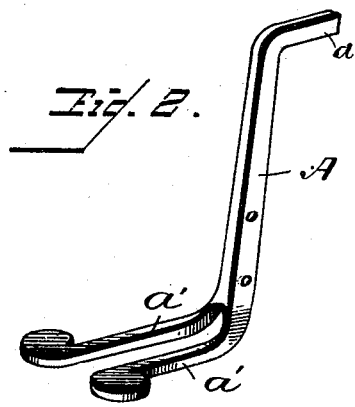
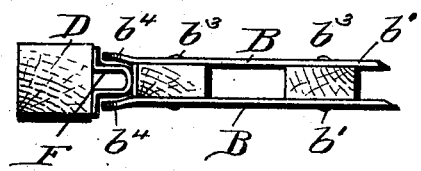
Witnesses
Inventors
Andrew E. Jester.
John G. Alexander.
By Attorneys

UNITED STATES PATENT OFFICE.

ANDREW EDMOND JESTER, OF JESTER, TENNESSEE, AND JOHN GILASPIE ALEXANDER, OF BOWIE, TEXAS.

GATE.

SPECIFICATION forming part of Letters Patent No. 508,573, dated November 14, 1893.

Application filed March 25, 1893. Serial No. 467,620. (No model.)

*To all whom it may concern:*

Be it known that we, ANDREW EDMOND JESTER, of Jester, county of Chester, State of Tennessee, and JOHN GILASPIE ALEXANDER, of Bowie, county of Montague, State of Texas, have invented certain new and useful Improvements in Gates; and we do hereby declare the following to be a full, clear, and exact description of the invention, such as will enable others skilled in the art to which it appertains to make and use the same.

This invention relates to farm gates which are adapted to be opened from either approach.

The objects of the invention are: to facilitate the opening of the gate without the intervention or use of the hands; to strengthen and brace the gate so as to prevent any possible sagging thereof, the braces being extended to form part of the hinge joint; to provide and dispose a latch so that it can be easily actuated by the foot from either approach for the purpose of releasing and opening the gate; lastly, to provide a gate that will close automatically without the use of springs and which will be simple, cheap, light and give satisfactory results.

This improved gate, while especially designed for farm use may be employed in banks, counting rooms and wherever it is desirable and possible to use a gate of this construction.

The improvement consists of the novel features and the peculiar construction and combination of the parts which will be hereinafter more fully described and claimed and which are shown in the annexed drawings, in which—

Figure 1 is a perspective view of a gate embodying our invention. Fig. 2 is a detail view of the latch detached. Fig. 3 is a detail section of a portion of the gate and the post to which the gate is hinged taken just above the lower hinge.

The posts C and D are set on opposite sides of the roadway, the post D having the gate hinged thereto, and the post C being provided with the stop which is engaged by the latch A. The stop E has oppositely inclined wing portions on which the end of the latch A rides when the gate is closing, and an intermediate depressed portion to receive the end of the latch to hold the gate shut when closed.

The present invention relates especially to the means for connecting together the pickets and bracing the gate, the same consisting of approximately Z-shaped braces B, the parallel portions $b$ $b'$ extending from one side of the gate to the other and being located near the top and bottom thereof, respectively. There are two of these Z-shaped braces B, one being located on each side of the gate embracing the pickets between them. These Z-braces B are of corresponding size and shape and are secured together by rivets or bolts $b^3$ which also pass through the pickets and serve to secure the latter in place as well as to connect the two braces together. The lower end $b^4$ and the upper end $b^5$ of the braces are projected a short distance in the rear of the inner end of the gate to form means for hanging or hinging the gate to the post D. The hook $d$ of usual construction receives the eye formed by the extended portion $d^5$ of the Z-brace. The extended portions $b^4$ embrace the sides of the iron F which is secured near the lower end of the post K.

In the construction of the Z-braces B a single length of strap iron is employed, said strap iron being folded on itself to form the eye portion $b^5$ to receive the hook $d$ and bent to form the portions $b^2$, $b'$ and $b$ substantially as shown. It will be observed that the portions $b$, $b'$ and $b^2$ are in the same plane and that the bent portions at the ends of the diagonal portion $b^2$ are also in the same plane with the said portions $b$, $b'$ and $b^3$; hence the said braces B are rigid and stiff at the angles and will not give to admit of any sag in the gate. The latch A is elbow shaped and is pivoted near the elbow between the brace portions. The bent end $a$ projects through a suitable opening formed in the front batten of the gate and engages with a stop E to lock the gate when closed. The lower portion of the latch is bifurcated to form the approximately parallel portions $a'$ $a'$ which extend on each side of the gate and are expanded at their free ends to present a broad surface for the foot to obtain a firm purchase upon. The spring $a^2$ is provided to hold the latch in an operative position so that it will automatically engage with the stop E when the gate is closed.

The gate is opened from either approach by pressing with the foot upon either portion $a'$ of the latch. A downward pressure of the foot disengages the latch from the stop E and a forward movement of the foot opens the gate. After the person has passed through the gate closes automatically. This is effected by having the active portions of the hinges out of perpendicular so that the gate is opened against the force of gravity which latter reacting closes the gate.

Having thus described our invention, what we claim, and desire to secure by Letters Patent, is—

1. A gate composed of pickets and approximately Z-shaped braces, one on each side of the gate, the pickets and braces being secured together by the same fastening, substantially as set forth.

2. A gate composed of pickets and two approximately Z-shaped braces integrally formed, one on each side of the gate, the said braces and pickets being secured together by the same fastening, substantially as set forth.

3. A gate composed of pickets, and two approximately Z-shaped braces integrally formed and located, one on each side of the gate, the ends $b^5$ and $b^4$ being projected in the rear of the gate to form hinges, substantially as described for the purpose set forth.

4. The combination with a post having a hook $b$ and an iron F, of a gate, and two approximately Z-shaped braces formed of a single length of strap iron and located, one on each side of the gate, and having the portions $b^5$ and $b^4$ projected in the rear of the gate, the former to receive the hook $d$, and the latter to embrace the sides of the iron, substantially as set forth.

In testimony whereof we affix our signatures in presence of two witnesses.

ANDREW EDMOND JESTER.
JOHN GILASPIE ALEXANDER.

Witnesses for A. E. Jester:
W. T. CASON,
S. E. REID.
Witnesses for J. G. Alexander:
W. J. ALLEN,
J. A. PICKENS.